(12) United States Patent
Walker

(10) Patent No.: US 7,032,325 B2
(45) Date of Patent: Apr. 25, 2006

(54) ELECTRONIC CONTROL DEVICE FOR GAS DRYER

(75) Inventor: Brian Walker, Northumberland (GB)

(73) Assignee: Walker Filtration Ltd., Tyne & Wear (GB)

( * ) Notice: Subject to any disclaimer, the term of this patent is extended or adjusted under 35 U.S.C. 154(b) by 47 days.

(21) Appl. No.: 10/813,921

(22) Filed: Mar. 31, 2004

(65) Prior Publication Data

US 2004/0231182 A1   Nov. 25, 2004

(30) Foreign Application Priority Data

Mar. 31, 2003   (GB) .................................. 0307422.6

(51) Int. Cl.
*F26B 3/00*   (2006.01)
(52) U.S. Cl. .......................................... 34/487; 34/527
(58) Field of Classification Search ................. 34/527, 34/487
See application file for complete search history.

(56) References Cited

U.S. PATENT DOCUMENTS

| | | | |
|---|---|---|---|
| 4,559,065 A | 12/1985 | Null et al. | |
| 5,563,585 A * | 10/1996 | MacDonald | 340/626 |
| 5,983,516 A | 11/1999 | Trapp et al. | |
| 6,050,651 A * | 4/2000 | Thomas | 303/86 |
| 6,128,825 A * | 10/2000 | Cunkelman | 34/79 |
| 6,581,297 B1 | 6/2003 | Ginder | |
| 6,640,463 B1 * | 11/2003 | Beck et al. | 34/527 |
| 2002/0175791 A1 * | 11/2002 | LaMarca et al. | 335/220 |

OTHER PUBLICATIONS

British Search Report (Application No. GB0407318.5) dated Jun. 30, 2004.

* cited by examiner

*Primary Examiner*—S. Gravini
(74) *Attorney, Agent, or Firm*—Dann, Dorfman, Herrell and Skillman, PC

(57) ABSTRACT

An electronic device is disclosed for controlling gas flow in a gas dryer such as a twin tower regenerative gas dryer. The device has a housing in which is mounted an electronic control circuit. At least two electrically operated valves (e.g. solenoid valves) for controlling functions of the dryer are provided with plugs or sockets and adapted to co-operate with corresponding sockets or plugs in a wall of the housing electrically connected to the electronic circuit. The valves are mounted on, externally of, the housing and are electrically connected to the control circuit.

12 Claims, 2 Drawing Sheets

ELECTRONIC CONTROL DEVICE FOR GAS DRYER

FIELD OF THE INVENTION

This invention relates to an electronic control device for a gas dryer, and has particular though not exclusive application to such devices for controlling a twin tower regenerative gas dryer.

BACKGROUND TO THE INVENTION

Gas dryers are conventionally each provided with their own electronic controllers which are specifically designed to carry out different functions associated with the particular dryer.

These controllers serve to operate the dryer, and are not readily adaptable to provide input and output facilities to other than the basic control functions of the associated dryer.

SUMMARY OF THE INVENTION

It would be desirable to be able to provide a compact, relatively adaptable electronic control device which can be used with any one of a plurality of different dryers. The present invention has as its object the provision of such a device.

According to the present invention, there is provided an electronic device for controlling gas flow in a gas dryer, the device comprising a housing in which is mounted an electronic control circuit, and at least two electrically operated valves for controlling functions of the dryer provided with plugs or sockets and adapted to co-operate with corresponding sockets or plugs in a wall of the housing electrically connected to the electronic circuit whereby the valves are mounted on, externally of, the housing and are electrically connected to the control circuit.

Such a device is extremely compact, eliminates the requirement for additional wiring between the valves and the control circuit, and is particularly useful for controlling the operation of a pressure swing twin tower regenerative gas drier, at least one of the valves being associated with control of the flow of gas in each of the towers.

Conveniently the valves are each solenoid valves, while it is preferred that the valves are each secured in an operative position on the housing, for example by a bolt.

In one embodiment of the invention, each valve is provided with DIN spade connectors thereon for location in corresponding sockets in the housing and for plugging into female DIN connectors on the electronic control circuit, which circuit is conveniently a circuit board.

Preferably at least part of the housing is transparent, and may include a body portion and a lid which is a sealing fit thereon.

A preferred device incorporates three valves, one for controlling the exhaust of each of the towers (whereby one tower is at pressure while the other tower is at atmospheric pressure), and the third valve controlling the drainage of liquid from the gas input to the dryer.

The device may have a single universal AC/DC power supply inlet or a dual AC/DC power supply inlet by means of two adjacent DIN type plug connections or by other means known in the art.

The preferred material for the housing is injection moulded plastic which can be designed and moulded to locate the valve DIN connections in specific locations to suit the dryer design. Whereas a plastic lid is the preferred option, a metal lid can be used which also acts as a heat sink to control the internal temperature of the electronic components.

When using LEDs to provide information relative to operation of the device, it is particularly advantageous to use a clear plastic lid which allows the LED illumination or LCD displays to be seen without compromising the IP rating of the housing or exposing the components to physical damage. The IP rating of the housing can be enhanced by using an 'O' ring, or similar seal, between the housing parts (the IP rating indicates the integrity of the insulation of the housing—i.e. the level of sealing to dust). Typically the housings will have IP ratings of IP65, but all other IP ratings are possible.

As previously mentioned, a third solenoid valve may be fixed to the device to provide a filter drain means which opens and closes in a pre-programmed time sequence, and whereby the filter bowls through which the moist input gas is fed to the dryer are regularly emptied without the requirement for any electronic components at/on the bowls.

A further DIN connector can be attached to the device providing a two wire, volt free contact which changes state if the device detects a circuit fault or a fault in the solenoid operation. This fault condition can trigger an audible alarm, visual alarm, control room alarm or a combination of methods.

A still further DIN connector, or the aforementioned further connector with a four core cable, can be used for operating the dryer in conjunction with the loading of the compressor such that, when the compressor goes 'off load', the dryer effectively stops the purge cycle immediately or after a predetermined time delay, and, when the compressor comes 'on load', the dryer starts up again. When operating in conjunction with a compressor, the device can have an infinite electronic memory which will re-start the dryer on the same tower as it stopped.

The device can be programmed and run using normal electronic components, but the preferred option is by means of micro-controllers, the use of such micro-controllers offering a much more powerful, low cost solution at an affordable price. The timing sequence of all valves and output signals are controlled by pre-programmed software.

The device can have an RS232, RS485 or like interface for connection to such as data logging devices, PC's and palm top computers. This feature enables the electronic control device to be connected individually or via an external computer network (with other control devices also connected) to a local or remote computer where the dryer parameters and potential electrical fault conditions can be monitored or changed, or the control software modified or upgraded.

Operating hours, electrical faults and operating parameters can be stored in the control device memory for future examination using the RS232 or RS485 interface.

Additional electrical inputs indicating other operating parameters such as temperature, pressure, dew-point, humidity or rate of flow can be fed into the control device for recording purposes or for automatic adjustment and control of the dryer cycle time and purge airflow rate.

The RS232 or RS485 interface can be used to provide a connection with other telecommunications devices, such as data logging, e-mail messages, text messages to mobile phones, and fault alarms to remote control room installations, and to output text information to LCD displays which can be incorporated into the housing or exported to external displays.

The device can have LED (or similar) components which illuminate when electrical power is reaching the device. This is normally known as 'Power on' mode. Further LED's can indicate which dryer tower is 'on-line' during operation.

The device can have further LED components to indicate service or maintenance intervals, such as desiccant change typically every 12,000 hours. Such LED's can be made to change colour and/or flash in a particular manner to indicate specific conditions. The device can also have a re-set switch method which can be used to re-set the device for the next timing period e.g. typically 12,000 hours.

The device can have further LED components to indicate when particular electrical faults occur, such as open or short circuit in critical components such as solenoid valves or control electronics. LED's can be made to change colour and/or flash in a particular manner to indicate specific conditions.

The device can be configured to accept any voltage between 240 and 50 V.AC, 50 or 60 Hz and 48 to 12 V.DC for true 'plug-in and run' anywhere in the world.

Whilst the device can have many input voltages, the preferred electrical outputs to operate the solenoid valves are low voltage for all applications, resulting in a higher degree of electrical safety (e.g. 12V.DC). This feature allows the standardisation of dryer operating valves, irrespective of the inlet supply voltage.

Conventional dryers have to use valves corresponding to the inlet supply voltage, which therefore involves a much higher inventory of valve parts.

While the above refers to two solenoid valve operation, the control device of the invention can be constructed to operate additional solenoid valves, the timing cycles of which are similarly programmable.

DETAILED DESCRIPTION OF THE PREFERRED EMBODIMENT

Figure 1:
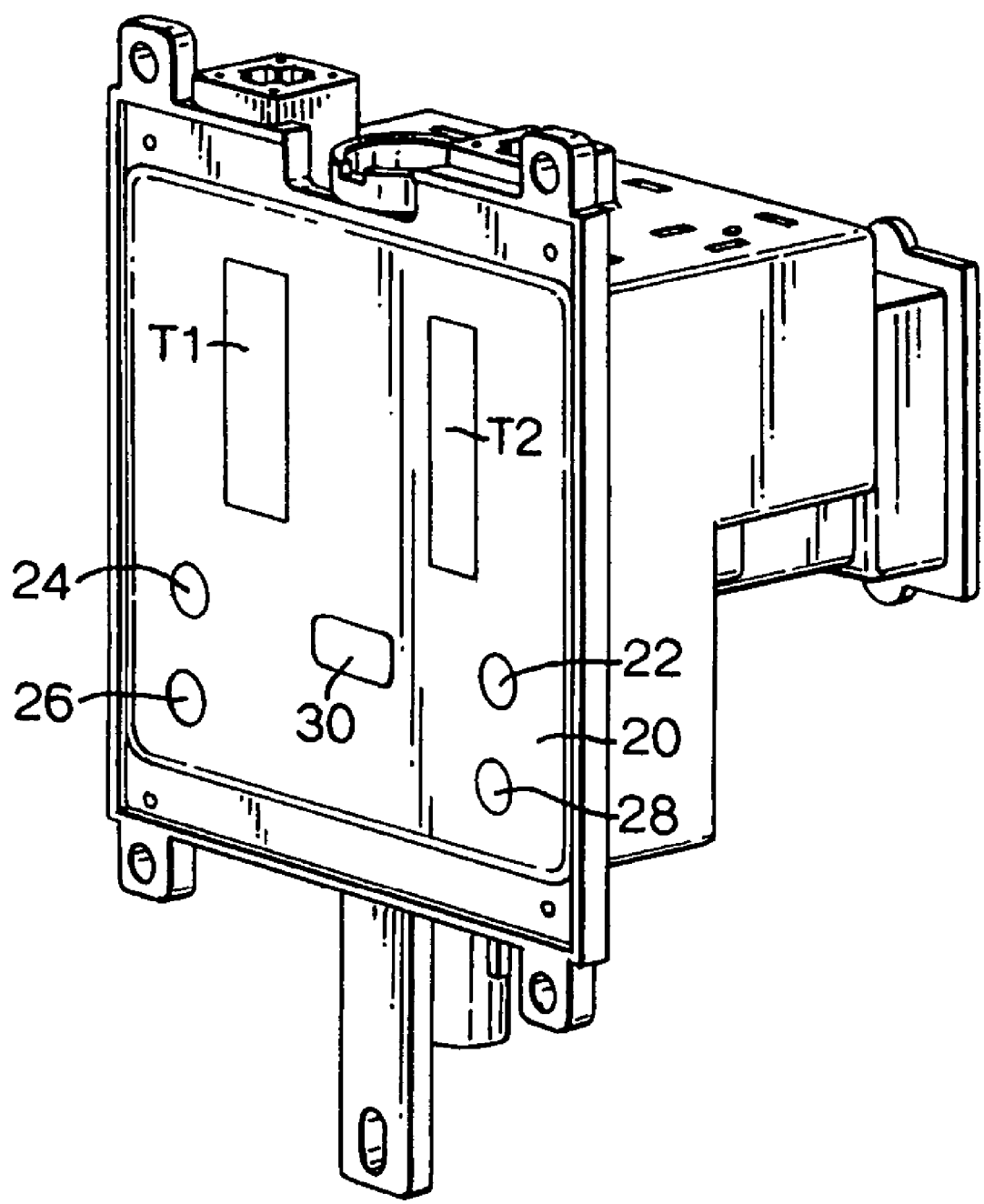
FIG. 1 is an isometric view of a housing of a control device according to the invention.
Figure 2:
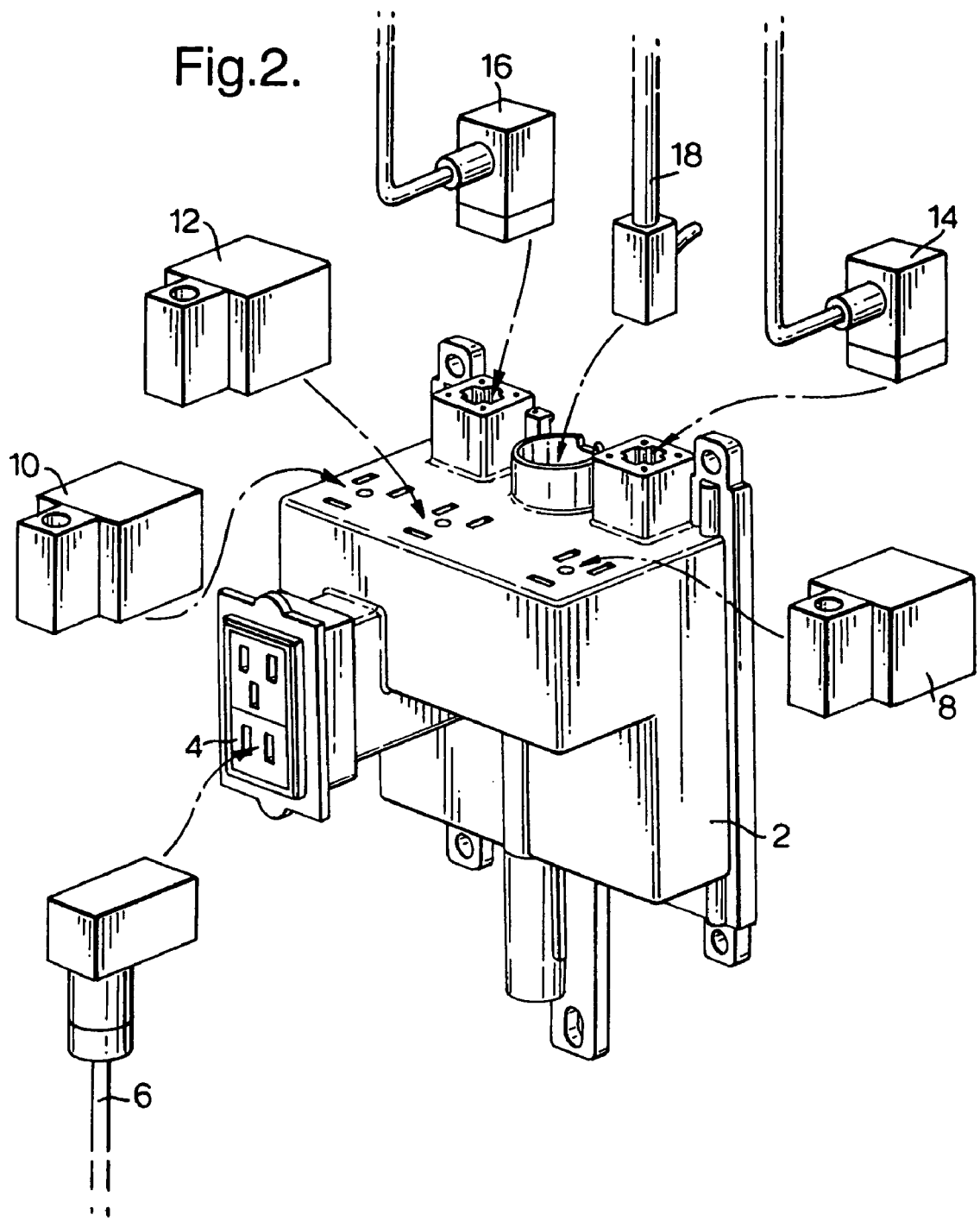
FIG. 2 is an exploded isometric view of a control device according to the invention.

Details of the operation of preferred embodiments of the device have already been given above. The preferred embodiment will now be described by way of example with reference to the drawings.

In the drawings:

reference numeral 2 indicates the housing of the device;

reference numeral 4 indicates the power-in socket (which may be AC and DC and may be a single universal AC/DC inlet or a dual AC/DC inlet);

reference numeral 6 indicates the power-in DIN plug;

reference numerals 8,10 and 12 indicate three solenoid valves, one for controlling the exhaust of each tower of the dryer, and the third for controlling the filter drain;

reference numeral 14 indicates a DIN plug associated with input signals to the device such as for energy management purposes;

reference numeral 16 indicates a DIN plug associated with output signals from the device such as alarm/fault conditions;

reference numeral 18 indicates an RS232 or RS485 input plug;

reference numeral 20 indicates the housing cover provided with transparent LED windows;

reference numerals 22 and 24 indicate tower on/off LED indicators, one for each tower;

reference numeral 26 represents the filter drain on/off LED indicator;

reference numeral 28 represents a power on/fault/cartridge change LED indicator;

reference numeral 30 indicates a reset switch, which may be of the contact or non-contact type.

The illustrated electronic control device is a compact, adaptable component capable of controlling numerous selective functions of, for example, a range of pressure swing turn tower regenerative gas dryers in an economic and effective manner.

The invention claimed is:

1. An electronic device for controlling gas flow in a gas dryer, the device comprising:
    a housing;
    an electronic control circuit mounted in the housing; and
    at least two electrically operated valves for controlling functions of the dryer, wherein said valves are provided with plugs or sockets that are adapted to co-operate with corresponding sockets or plugs in a wall of the housing electrically connected to the electronic circuit whereby the valves are mounted on, externally of, the housing and are electrically connected to the control circuit.

2. A device according to claim 1 wherein the valves are each secured in an operative position on the housing.

3. A device according to claim 1 wherein each valve is provided with DIN spade connectors thereon for location in corresponding sockets in the housing and for plugging into female DIN connectors on the electronic control circuit.

4. A device according to claim 1 wherein at least part of the housing is transparent.

5. A device according to claim 4 having one or more display devices that are viewable through the transparent part of the housing.

6. A device according to claim 1 wherein the housing includes a body portion and a lid which has a sealing fit thereon.

7. A device according to claim 1 incorporating three valves, a third one of which valves is for controlling drainage of liquid from a gas input to the dryer.

8. A device according to claim 7 wherein said third valve provides a filter drain means that opens and closes in a pre-programmed time sequence so that filter bowls through which the moist input gas is fed to the dryer are regularly emptied.

9. A device according to claim 1 having a two wire, volt free contact that changes state when the device detects a circuit fault or a fault in the solenoid operation, for triggering an alarm.

10. A device according to claim 1 having a four core cable for operating the dryer in conjunction with the loading of a compressor such that, when the compressor goes 'off load', the dryer stops the purge cycle immediately or after a predetermined time delay, and, when the compressor comes 'on load', the dryer starts up again.

11. A method of controlling the operation of a pressure swing twin tower regenerative gas drier using an electronic device comprising:
    a housing;
    an electronic control circuit mounted in the housing; and
    at least two electrically operated valves for controlling functions of the dryer, in which device said valves are provided with plugs or sockets that are adapted to co-operate with corresponding sockets or plugs in a wall of the housing electrically connected to the electronic circuit so that the valves are mounted on, externally of, the housing and are electrically connected to the control circuit, wherein at least one of the valves is associated with control of the flow of gas in each of the towers.

12. A method according to claim 11 wherein the device has three valves, a first one of said valves being for controlling the exhaust of a first tower that is at pressure, a second one of said valves being for control of a second tower that is at atmospheric pressure, and a third one of said valves being for controlling the drainage of liquid from the gas input to the dryer.

* * * * *